US00RE48264E

(19) United States
(12) Reissued Patent
Ramirez

(10) Patent Number: US RE48,264 E
(45) Date of Reissued Patent: Oct. 13, 2020

(54) POWER DELIVERY SYSTEM FOR HID, LED, OR FLUORESCENT TRACK LIGHTING

(71) Applicant: Rafael M Ramirez, Brooklyn, NY (US)

(72) Inventor: Rafael M Ramirez, Brooklyn, NY (US)

(21) Appl. No.: 16/439,098

(22) Filed: Jun. 12, 2019

Related U.S. Patent Documents

Reissue of:
(64) Patent No.: 9,677,746
Issued: Jun. 13, 2017
Appl. No.: 12/537,576
Filed: Aug. 7, 2009

U.S. Applications:
(60) Provisional application No. 61/218,308, filed on Jun. 18, 2009.

(51) Int. Cl.

| | |
|---|---|
| ***H05B 47/18*** | (2020.01) |
| ***F21V 21/35*** | (2006.01) |
| ***F21V 19/00*** | (2006.01) |
| ***H01R 25/14*** | (2006.01) |
| ***F21S 8/06*** | (2006.01) |

(52) U.S. Cl.
CPC ..... *H05B 47/18* (2020.01); *F21V 19/0085* (2013.01); *F21V 21/35* (2013.01); *H01R 25/14* (2013.01); *F21S 8/068* (2013.01)

(58) Field of Classification Search
CPC ..... H05B 47/18; H01R 25/14; F21V 21/35; F21V 19/0085; F21S 8/068
USPC ..... 362/402
See application file for complete search history.

(56) References Cited

U.S. PATENT DOCUMENTS

| | | | | |
|---|---|---|---|---|
| 739,845 | A | 9/1903 | Evans | F21S 8/06 362/147 |
| 3,040,993 | A | 6/1962 | Schultz | F21V 13/00 362/269 |
| 3,125,301 | A | 3/1964 | Stotter | F21V 7/09 362/217.06 |
| 3,246,074 | A * | 4/1966 | Neumann | H01R 25/14 174/493 |
| 3,489,981 | A | 1/1970 | Corl et al. | H01R 25/14 439/116 |
| 3,496,518 | A * | 2/1970 | Donato | H01R 25/14 439/118 |
| 3,503,032 | A | 3/1970 | Routh et al. | H01R 25/142 439/94 |
| 3,529,274 | A | 9/1970 | Routh | F21V 21/35 439/118 |

(Continued)

FOREIGN PATENT DOCUMENTS

WO PCT/US2009/053127 7/2010

*Primary Examiner* — William C Doerrler
(74) *Attorney, Agent, or Firm* — Vincent G. LoTempio; David T. Stephenson

(57) ABSTRACT

A system according to an embodiment of the invention may include a track and a power supply substantially contained within the track. One or more lamps may be electrically connected to the power supply. The lamp may be an HID lamp, an LED lamp, or a fluorescent lamp. The power supply may be a ballast or a transformer, and may comprise a printed circuit board with electrical power handling components on one side. The system may also include a housing which may surround the power supply.

12 Claims, 13 Drawing Sheets

(56) References Cited

U.S. PATENT DOCUMENTS 3,801,951 A 4/1974 Kemmerer et al. . H01R 13/521 439/116
3,832,503 A 8/1974 Crane ..... H01R 25/142 200/51 R
3,894,781 A 7/1975 Donato ..... H01R 25/142 439/121
4,414,617 A * 11/1983 Galindo ..... H01R 25/14 362/150
D287,413 S 12/1986 Kusmer et al. ..... H01R 25/142 D26/65
D291,605 S 8/1987 Roos ..... H01R 25/142 D26/60
5,025,355 A * 6/1991 Harwood ..... F21S 8/06 362/147
D318,740 S 7/1991 Layne ..... D26/63
D326,162 S 5/1992 Price ..... D26/63
5,140,507 A * 8/1992 Harwood ..... F21S 8/038 248/278.1
5,154,509 A * 10/1992 Wulfman et al. ..... F21V 21/096 362/227
5,582,520 A 12/1996 Doudon ..... H01R 25/142 439/106
D380,847 S 7/1997 Mier-Langner et al. ..... F21S 8/038 D26/63
D389,260 S 1/1998 Mier-Langner et al. ..... F21V 21/096 D26/63
5,785,411 A 7/1998 Komai et al. ..... F21V 19/0085 362/219
D413,176 S 8/1999 Mier-Langner ..... D26/63
6,033,097 A * 3/2000 Harwood ..... F21V 21/34 362/404
D436,678 S 1/2001 Mier-Langner et al. ..... F21V 19/0085 D26/63
D552,780 S 10/2007 Starck ..... G09F 13/20 D26/63
2002/0064050 A1* 5/2002 Yaphe et al. ..... F21S 2/00 362/404
2003/0179578 A1* 9/2003 Albert et al. ..... H05B 47/18 362/276
2003/0223232 A1* 12/2003 Belfer et al. ..... F21V 19/0085 362/219
2005/0152132 A1* 7/2005 Bernhart ..... F21S 8/06 362/147
2006/0262521 A1* 11/2006 Piepgras et al. ..... E04B 9/006 362/149
2007/0086189 A1* 4/2007 Raos et al. ..... G09F 13/20 362/249.01
2007/0123075 A1* 5/2007 Insalaco et al. ..... H02G 3/0493 439/120
2007/0139929 A1* 6/2007 Yoo et al. ..... H05K 1/0206 362/294
2007/0285949 A1* 12/2007 Lodhie ..... F21V 21/35 362/648
2008/0081500 A1* 4/2008 Chen ..... H01R 25/145 439/209
2008/0155915 A1* 7/2008 Howe et al. ..... H02G 3/00 52/220.3

* cited by examiner

Fig. 4a
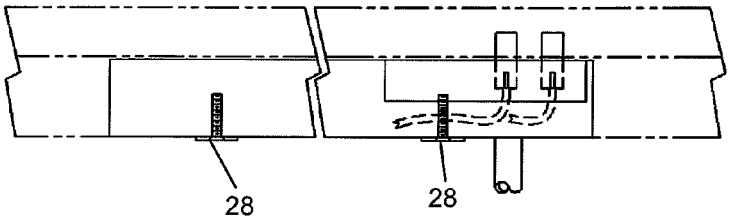
Fig. 4b
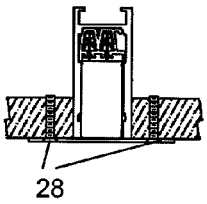
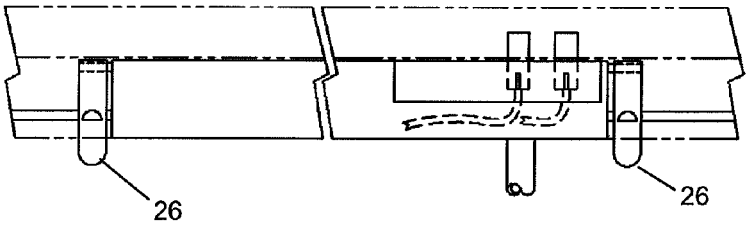
Fig. 5a
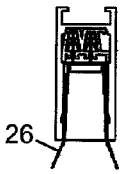
Fig. 5b

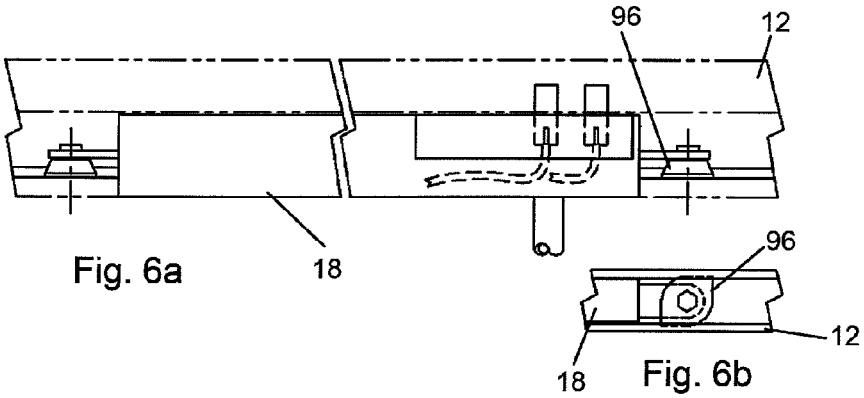
Fig. 6a
Fig. 6b
Fig. 6c
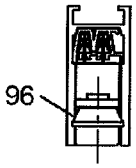

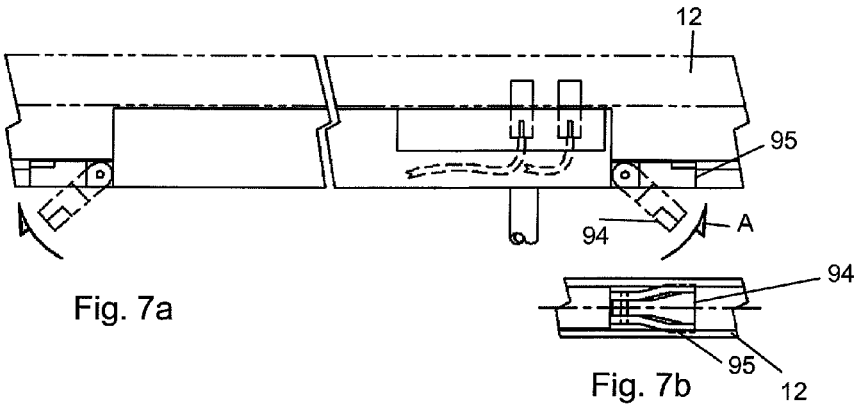
Fig. 7a
Fig. 7b
Fig. 7c
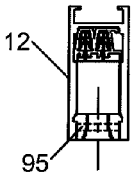
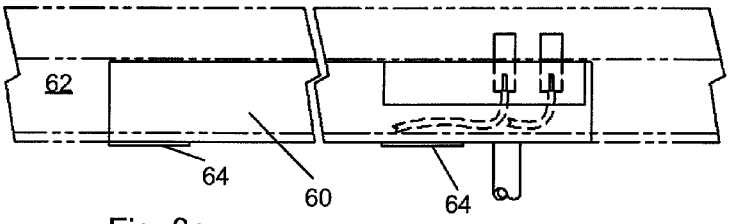
Fig. 8a
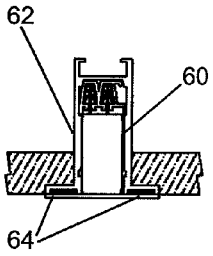
Fig. 8b

POWER DELIVERY SYSTEM FOR HID, LED, OR FLUORESCENT TRACK LIGHTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of priority to U.S. provisional patent application Ser. No. 61/218,308, filed on Jun. 18, 2009.

FIELD OF THE INVENTION

The present invention relates generally to power supplies for track and busway systems, and in particular, to a power supply unit for high-intensity discharge ("HID"), light-emitting diode ("LED"), and fluorescent track light fixtures.

BACKGROUND OF THE INVENTION

Track lighting systems are commonplace in many applications, including commercial (e.g. retail store), residential, and museum applications. Track systems offer flexibility such that lighting fixture arrangements may be reconfigured to meet the changing lighting requirements of a space without the need for skilled tradesmen or additional specialized equipment to adjust existing fixtures or to install additional fixtures. Lighting fixtures within track lighting systems may also be readily changed or reconfigured in order to keep pace with changing styles and technological advances.

High-intensity discharge ("HID") lamps are popular because they are able to convert a greater amount of the energy they consume into visible light, as opposed to heat. They are much more energy efficient than traditional incandescent light sources. Light-emitting diode ("LED") and fluorescent lamps have also found popularity due to their low power consumption and long life. HID, LED, and fluorescent lamps, however, require power supplies that condition the power provided to the lamp (e.g. higher voltage to strike an electrical arc in an HID lamp, regulated constant current or voltage for LED lamps, etc.). Such power supplies and the enclosures that typically contain them may occupy a relatively large amount of space. This may be problematic in a track lighting system because space is very often in short supply within the track, as many lighting installations call for the use of a large number of fixtures to achieve the required light levels or the desired lighting effects.

One way to provide power to HID, LED, or fluorescent track fixtures is by means of power supply units physically located below the track (see, e.g., U.S. Pat. No. 3,489,981, D413,176, D436,678, and D552,780). There are real cost and performance constraints that require that the power supplies be located in general proximity to the light sources, but not so close that they can be affected by the heat produced by the light sources. Additionally, there are electrical and building code regulations that require power supplies and other electrical components to be located so they are readily accessible for replacement or inspection.

These constraints and regulations have, for the most part, defined the arrangement and location of the power supply within the lighting system in relationship to the track and the light source. As such, the power supplies are typically built into each fixture in an isolated enclosure, thus creating an additional and fully visible element as an integral part of the light fixture and the lighting system itself. Such an arrangement and the resulting system, however, may not be aesthetically pleasing. Accordingly, there is a need for a power delivery system for HID, LED or fluorescent light sources where a power supply may be substantially contained within a track, and in some instances, the power supply should be kept in relative proximity to the light source, but providing a less cluttered and more aesthetically pleasing appearance.

BRIEF SUMMARY OF THE INVENTION

A system according to one embodiment of the invention includes a track and a power supply substantially contained within the track. In doing so, the power supply may be substantially concealed within the track. One or more lamps may be electrically connected to the power supply. The lamp may be an HID lamp, an LED lamp, or a fluorescent lamp. The power supply may be a ballast, and may comprise a printed circuit board with electrical power handling components on one side. The system may also include a housing which may surround the power supply.

The housing may be adapted to interface with the track and may be substantially contained within the track. The housing may be attached to the track. Such attachment may be by way of a fastener or force, such as friction or magnetism.

The lamp may be part of a sign and/or a signal. As such, the lamp may illuminate a word and/or a symbol to guide a person. The lamp may be part of a luminaire.

A luminaire may be attached to the housing by way of a suspender, which may be a yoke, a cable or a stem. The luminaire may be attached to the housing, the track, or a position not related to the track (e.g., a wall or a cable suspension system). The suspender may include means for fixing the position of the luminaire relative to the housing and/or maintaining a predesigned focusing radius of the luminaire.

A system according to another embodiment of the invention may include a communication circuit electrically connected to the power supply and in communication with a remotely addressable control system to provide control of one or more lamps. The communication circuit may also include a circuit for wireless communication.

The invention may be embodied as a device which may include a power supply and a housing surrounding the power supply. The housing may be configured to be capable of insertion in and/or attachment to a track. The device may include a lamp, which may be an HID, LED, or fluorescent lamp.

Because the power supply is in close contact with the track system, a large amount of the heat energy produced by the power supply is absorbed and diffused by the relatively large thermal mass and surface area that the track or busway provide. This has a measurable beneficial effect on the power supply's electrical and electronic components. It is widely known that operation at elevated temperatures is the main cause of premature failure for electrical and electronic components. Additionally, any lamp in proximity to the power supply may also benefit from this "heat sink" effect that the close contact with the track provides. By operating at relatively lower temperatures the average lifetime of the lamps and components is significantly extended, resulting in more reliable and durable lighting fixtures, and reduced operating and maintenance costs.

DESCRIPTION OF THE DRAWINGS

For a fuller understanding of the nature and objects of the invention, reference should be made to the following detailed description taken in conjunction with the accompanying drawings, in which:

FIG. 1b is an end view of the system of FIG. 1a;

FIG. 2b is an end view of the system of FIG. 2a;

FIG. 3b is another perspective view of the housing and power supply of FIG. 3a;

FIG. 4a is a side view of a system according to another embodiment of the present invention, showing screw fasteners and a portion of the track;

FIG. 4b is an end view of the system of FIG. 4a;

FIG. 5a is a side view of a system according to another embodiment of the present invention, showing mechanical clip fasteners and a portion of the track;

FIG. 5b is an end view of the system of FIG. 5a;

FIG. 6a is a side view of a system according to another embodiment of the present invention, showing cam fasteners and a portion of the track;

FIG. 6b is a bottom view of a portion of the system of FIG. 6a, showing a cam fastener;

FIG. 6c is an end view of the system of FIG. 6a;

FIG. 7a is a side view of a system according to another embodiment of the present invention, showing expansion elements and a portion of the track;

FIG. 7b is a bottom view of a portion of the system of FIG. 7a, showing an expansion element;

FIG. 7c is an end view of the system of FIG. 7a;

FIG. 8a is a side view of a system according to another embodiment of the present invention, showing magnet elements and a portion of the track;

FIG. 8b is an end view of the system of FIG. 8a;

DETAILED DESCRIPTION OF THE INVENTION

Figure 1B:
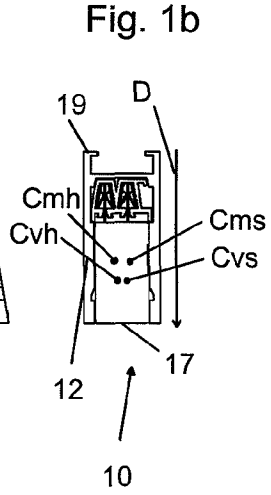
Figure 1A:
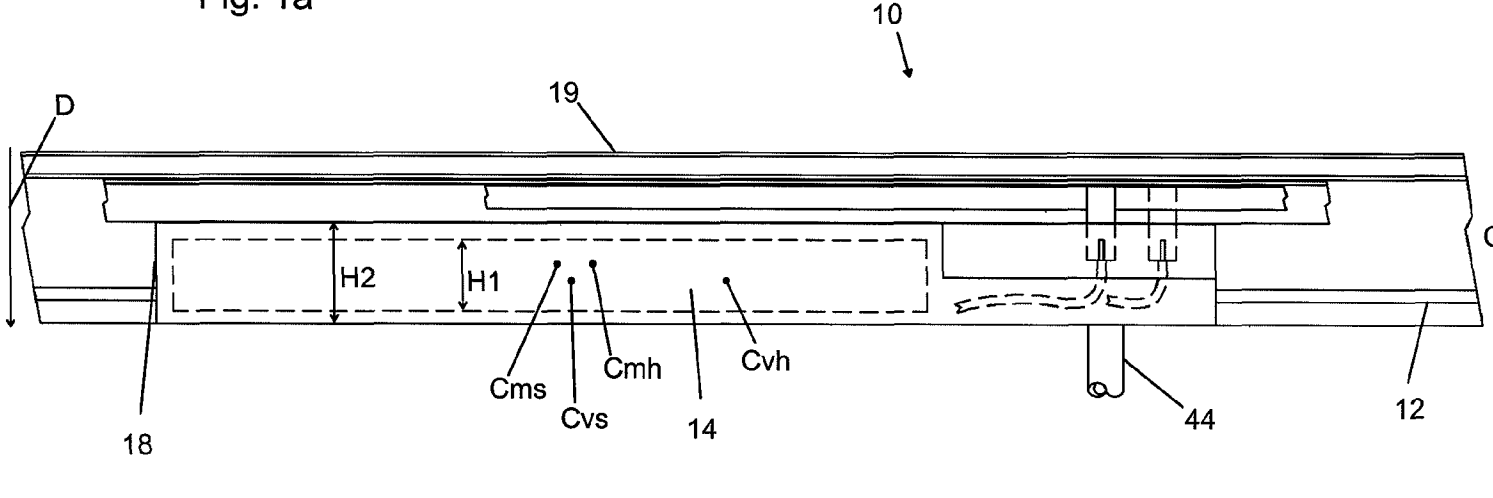
FIG. 1a is a side view of a system according to an embodiment of the present invention.
Figure 1C:
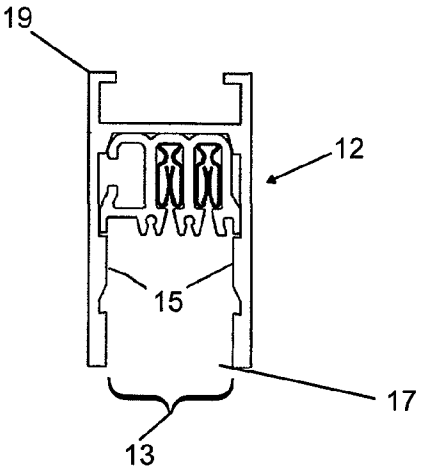
FIG. 1c is an end view of a track.
Figure 9A:
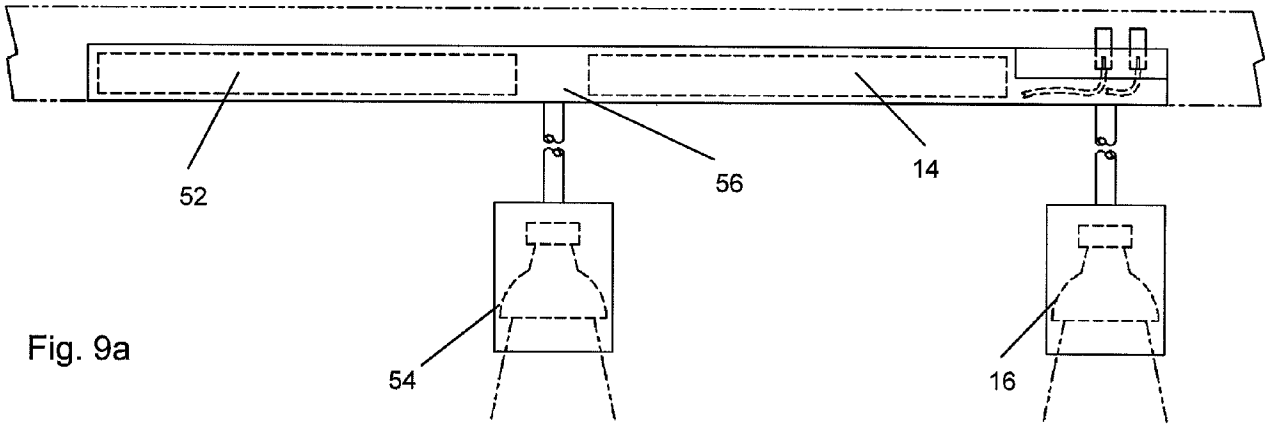
FIG. 9a is a side view of a system according to another embodiment of the present invention having a second power supply and a second lamp-a portion of the track is shown.
Figure 9B:
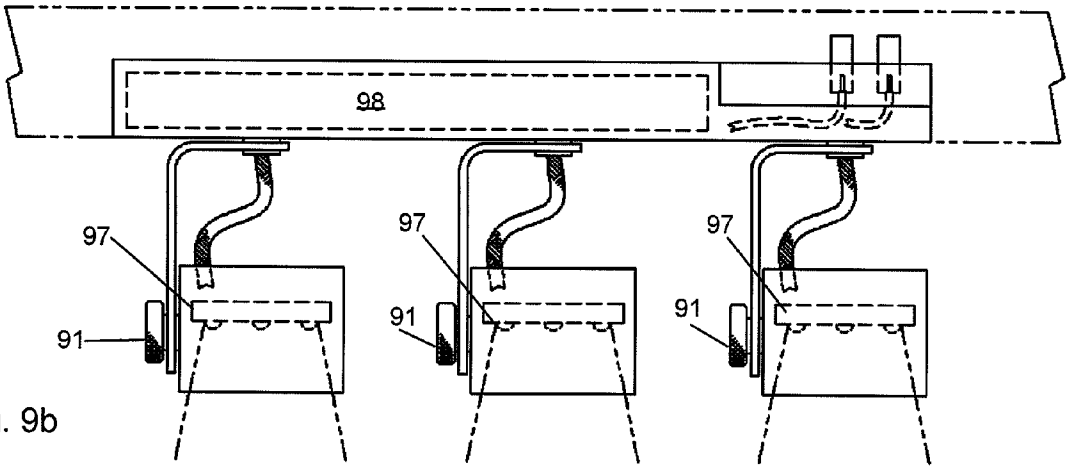
FIG. 9b is a side view of a system according to another embodiment of the present invention, showing the use of more than one luminaire and a portion of the track.

FIGS. 1a, 1b, and 1c depict a system 10 according to an embodiment of the invention which may include a track 12 having a base 19 and an opening 17. The track 12 may be a busway or a track suitable for lighting systems. Heights of components of the system (designated as H1 and H2) are measured in a direction which is parallel to the base 19-to-opening 17 direction D when the respective components are oriented for insertion into the track 12. The track 12 may be suspended from, recessed into, or mounted on a building structure (for example, a ceiling). A power supply 14 may be substantially contained within the track 12. In this manner, a majority of the power supply 14 may be contained within a channel 13 of the track 12. In one embodiment, less than 50% of the power supply 14 in the direction of height H1 extends beyond the opening 17. In another embodiment, a center of mass Cms of the power supply 14 is within the channel 13 (between sides 15 and within opening 17). In another embodiment, a volumetric center Cvs of the power supply 14 is within the channel 13 (between sides 15 and within opening 17). A lamp 16 may be electrically connected to the power supply 14. The lamp 16 may be a high-intensity discharge ("HID") lamp or a light-emitting diode ("LED") lamp. The power supply 14 may be a ballast, which may regulate the flow of electric current through a gas discharge lamp, such as an HID lamp. FIG. 9b depicts one embodiment of the invention in which more than one lamp 97 is connected to the power supply 98.

Figure 3A:
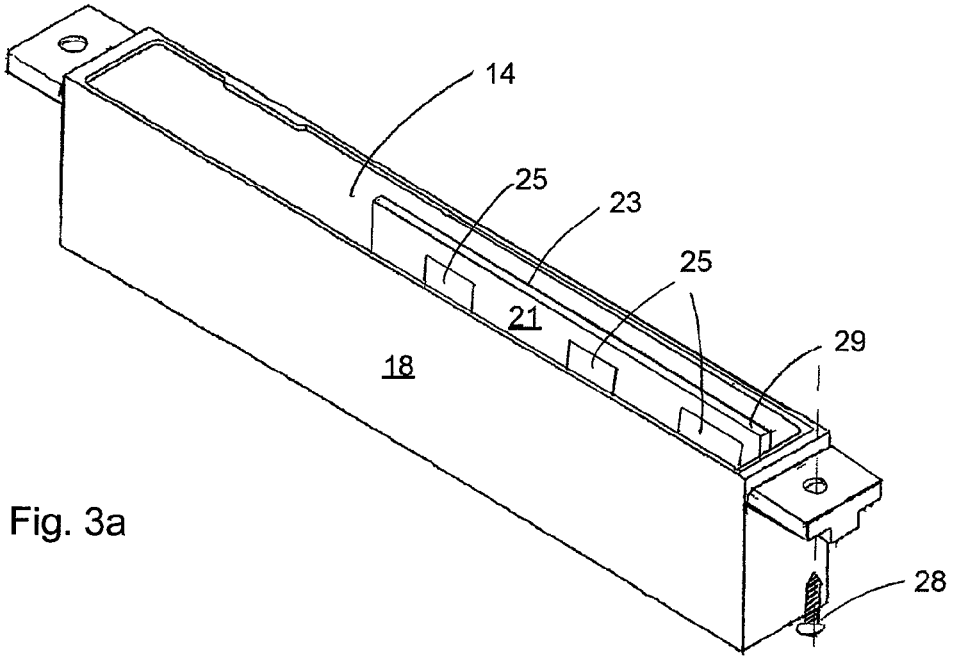
FIG. 3a is a perspective view of a housing and power supply according to another embodiment of the present invention.
Figure 3B:
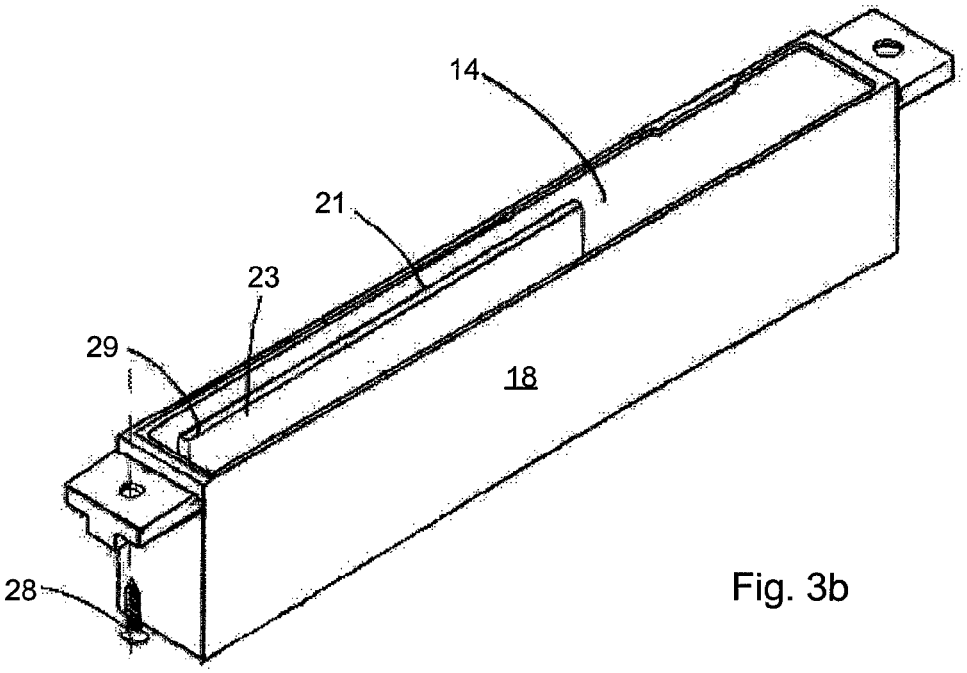

The power supply 14 may comprise a printed circuit board ("PCB") 29 which may have a first major surface 21 and a second major surface 23 (see, e.g., FIGS. 3a and 3b). One or more electrical power handling components 25, such as transformers, transistors, and/or inductors, may be mounted to the first major surface 21 only. In this manner, the size of the power supply may be minimized and/or the size of the electrical power handling components may be maximized for a particular track 12 configuration. At least one of the electrical power handling components 25 may be a semiconductor.

Figure 2B:
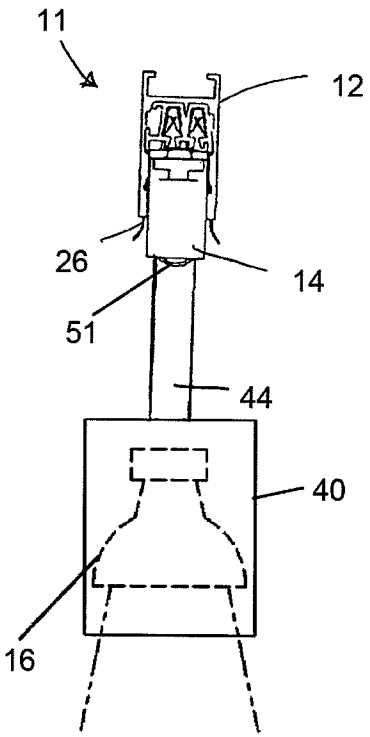
Figure 2A:
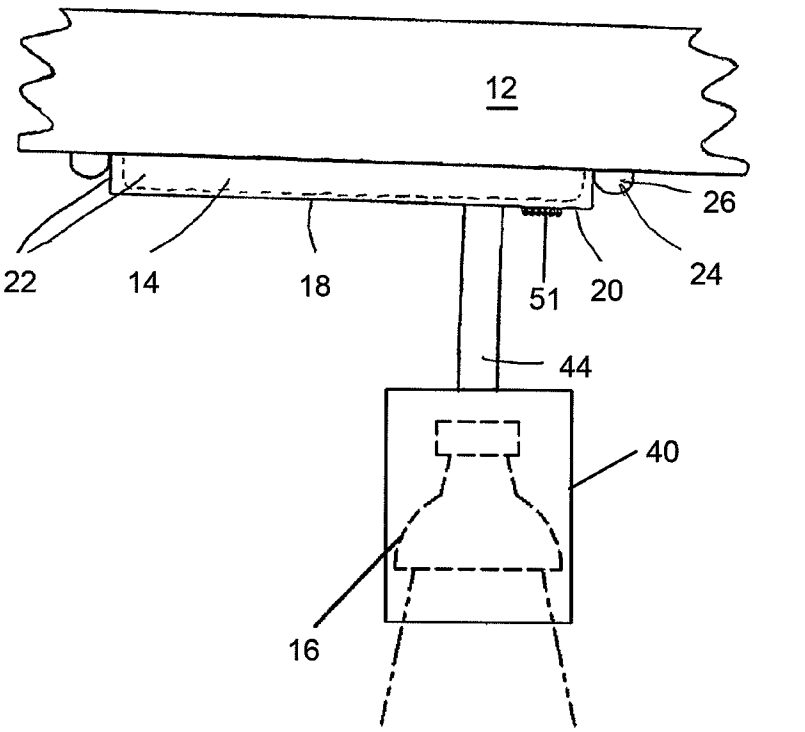
FIG. 2a is a side view of a system according to another embodiment of the present invention, in which a portion of the track is depicted.

The embodiment depicted in FIGS. 2a and 2b shows a system 11 which includes a housing 18 surrounding the power supply 14. The housing 18 may be adapted to interface with the track 12 and may be substantially contained within the track 12. In this manner, substantially all of the housing 18 may be contained within a channel 13 of the track 12. In such an arrangement, a lamp-interface surface 20 of the housing 18 may be visible outside the track 12. When substantially contained, portions 22 of the housing 18 may be visible outside the track 12, for example, see FIG. 2a. In one embodiment, less than 50% of the housing 18 in the direction of height H2 extends beyond the opening 17 (see, e.g., FIGS. 1a, 1b, and 1c). In another embodiment, the lamp-interface surface 20 of the housing 18 is flush with the opening 17 of the track 12. In another embodiment, a center of mass Cmh of the housing 18 is within the channel 13 (between sides 15 and within opening 17). In another embodiment, a volumetric center Cvh of the housing 18 is within the channel 13 (between sides 15 and within opening 17). In another embodiment, the surface area of the housing 18 is substantially covered by the track 12. FIG. 9a depicts an embodiment of the invention in which a housing 56 may additionally surround a second power supply 52 which may be electrically connected to a second lamp 54.

The housing 18 may be attached to the track 12 and may be held in a fixed position in a channel 13 (FIG. 1c) of the track 12. The attachment of the housing 18 to the track 12 may be made by the use of a fastener 24, which may be, for example, a screw 28 (see, e.g., FIGS. 3a, 3b, 4a, and 4b) or a mechanical clip 26 (see, e.g., FIGS. 5a and 5b). As used herein, the term "mechanical clip" may be used interchangeable with the terms "spring clip," "clip," or "spring," unless otherwise stated. The fastener may be a cam 96, which may have a first orientation for allowing removal and installation of the housing 18 from/to the track 12 and a second orientation for securing the housing 18 to the track 12 (see, e.g., FIGS. 6a, 6b, and 6c). The fastener may be an expansion element 95, which may expand to grip the track 12 when a lever 94 is moved in the direction of arrow A (see, e.g., FIGS. 7a, 7b, and 7c). The housing 18 may be secured to the track 12 by a combination of the fasteners described herein.

The fastener 24 may be used as an electrical ground providing a grounding conductor from the power supply 14 to the track 12. Alternatively, a grounding path may be provided via the housing 18 through contact of the housing 18 and the track 12.

The housing 18 may be attached to the track 12 by the use of magnetic force (see, e.g., FIGS. 8a and 8b). For example, one or more magnets 64 may be disposed on the housing 60 and/or on the track 62, to provide an attractive force which holds the housing 60 to the track 62. Alternatively, the housing 60 and/or the track 62 may be magnetized to provide the attractive force between the housing 60 and the track 62.

The housing 18 may be attached to the track 12 using a friction fit between the housing 18 and the sides 15 of the channel 13 of the track 12. The housing 18 may be sized relative to the channel 13 to require force to insert and/or remove the housing 18. In this manner, the housing 18 will be retained in the track 12 until a detaching force is applied sufficient to overcome the friction between the housing 18 and the sides 15 of the channel 13.

Figure 10A:
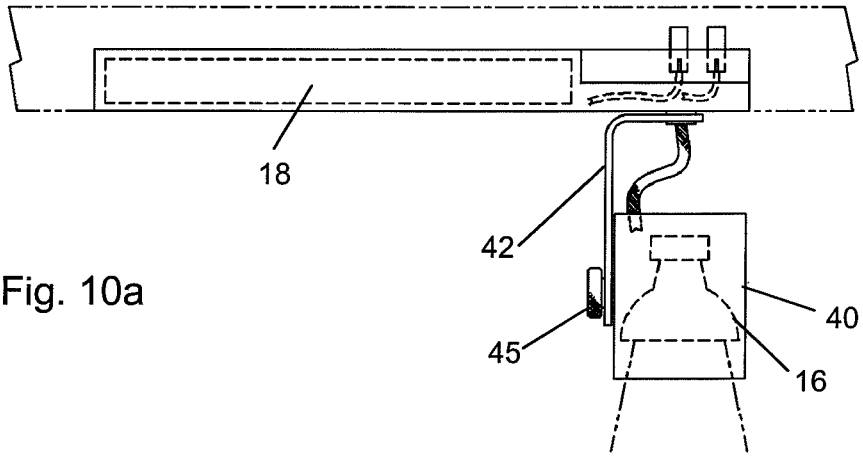
FIG. 10a is a side view of a system according to another embodiment of the invention showing a luminaire with a yoke suspender and a portion of the track.
Figure 13:
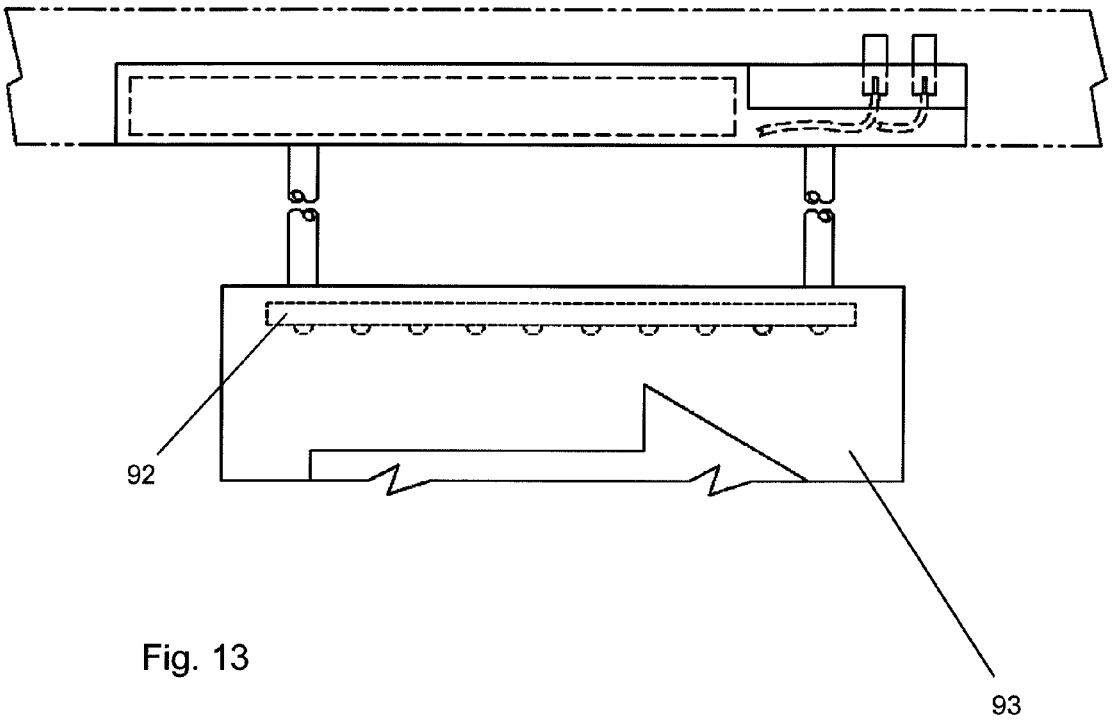
FIG. 13 is a side view of a system according to another embodiment of the invention wherein the lamp is part of a sign or signal—a portion of the track is shown.

In an embodiment depicted in FIG. 13, the lamp 92 may be part of a sign and/or a signal 93. In an embodiment depicted in FIGS. 10a-10c, the lamp 16 may be a part of a lighting fixture, such as luminaire 40. The luminaire 40 may be attached to the housing 18 by way of a suspender, which may be a yoke 42 (see, e.g., FIG. 10a). The yoke 42 may be a single-sided yoke, a double-sided yoke, or any yoke known to those skilled in the art. In another embodiment the suspender may be a stem 44 (see. e.g., FIG. 10c).

Figure 10B:
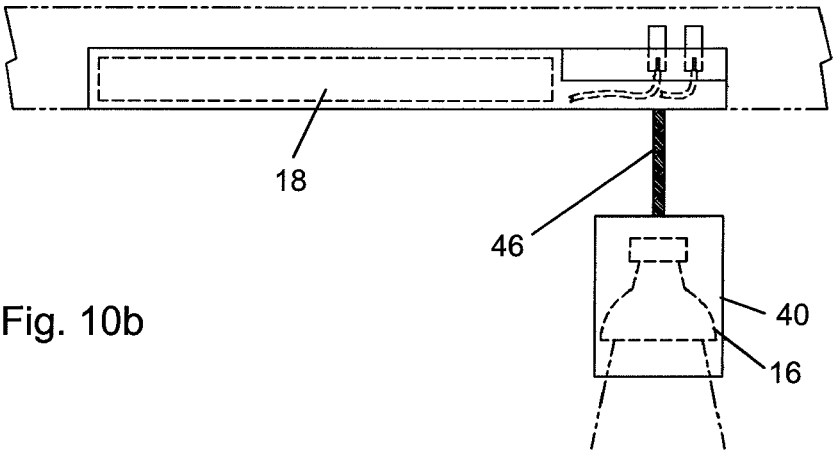
FIG. 10b is a side view of a system according to another embodiment of the invention showing a luminaire with a cable suspender and a portion of the track.
Figure 10C:
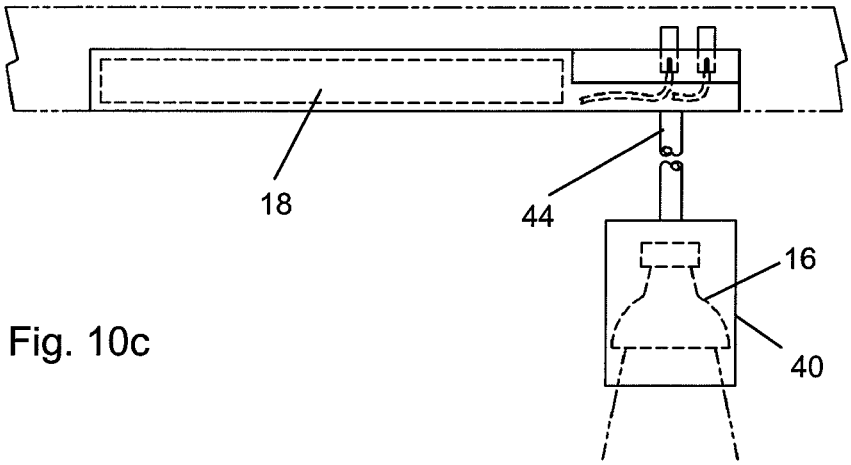
FIG. 10c is a side view of a system according to another embodiment of the invention showing a luminaire with a stem suspender and a portion of the track.
Figure 11A:
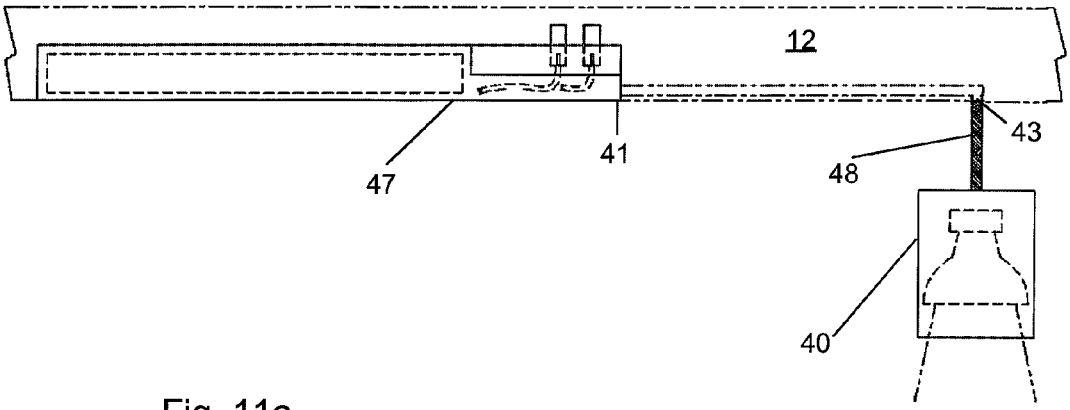
FIG. 11a is a side view of a system according to another embodiment of the invention showing a luminaire with a cable suspended from a position along the track and a portion of the track.
Figure 11B:
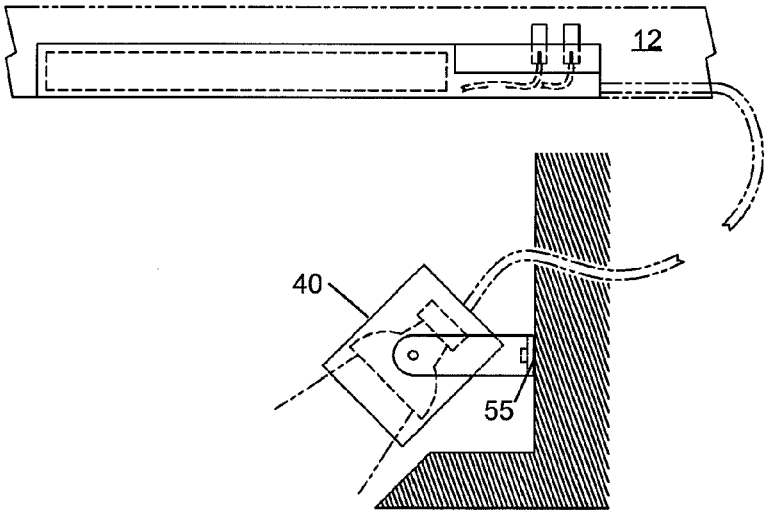
FIG. 11b is a side view of a system according to another embodiment of the invention showing a portion of the track and a luminaire located in a position not on the track.

In another embodiment, depicted in FIG. 10b, the suspender may be a cable 46 which suspends the luminaire 40 from the housing 18. Alternatively, the luminaire 40 may be suspended from a cable 48, which may not be suspended from the housing 47, but is instead suspended from the track 12 at a position 43 away from the position 41 of the housing 47 (see, e.g., FIG. 1a). In another alternative, the luminaire 40 may be located at a position 55 not along the track 12 (see, e.g., FIG. 11b). For example, the luminaire 40 may be attached to a position on a nearby wall or ceiling.

Figure 11C:
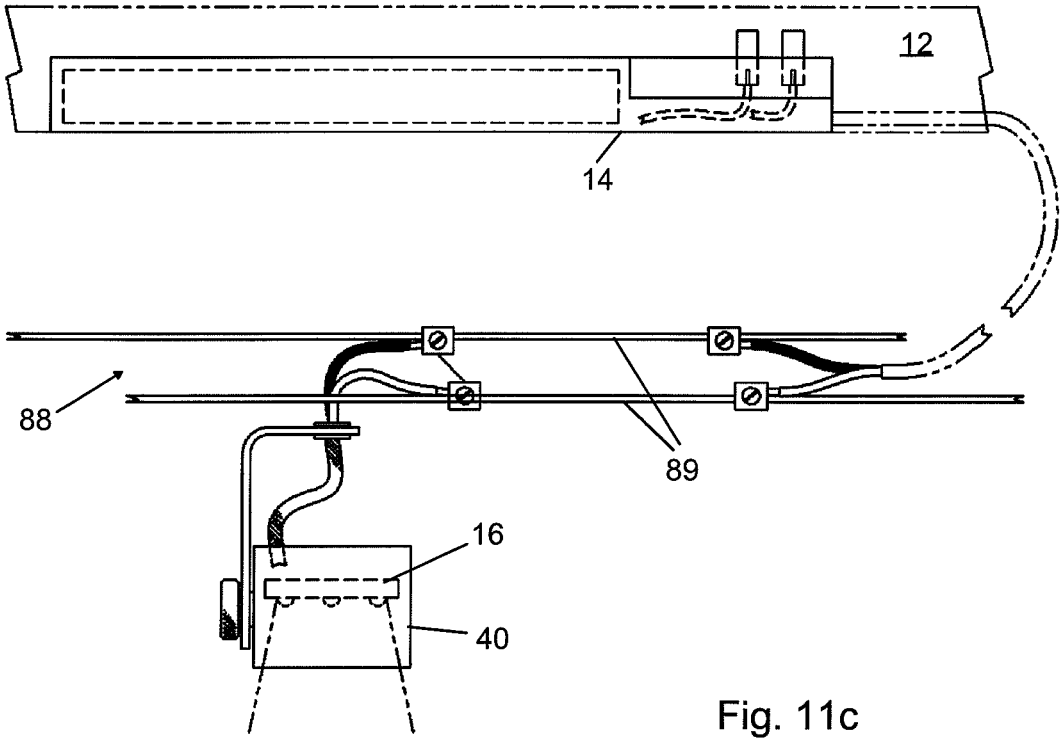
FIG. 11c is a side view of a system according to another embodiment of the invention showing a portion of the track and a luminaire in electrical communication with a power supply by way of a cable suspension system.

FIG. 11c depicts an embodiment wherein the luminaire 40 is attached to a cable suspension system 88. The cable suspension system 88 may be electrically connected to the power supply 14. The cable suspension system 88 may be electrically conductive so as to provide an electrical connection between the lamp 16 and the power supply 14. The cable suspension system 88 may have more than one conductor 89 to provide at least a complete electrical circuit between the power supply 14 and the lamp 16. The cable suspension system 88 may be structurally independent from the track 12.

Figure 14:
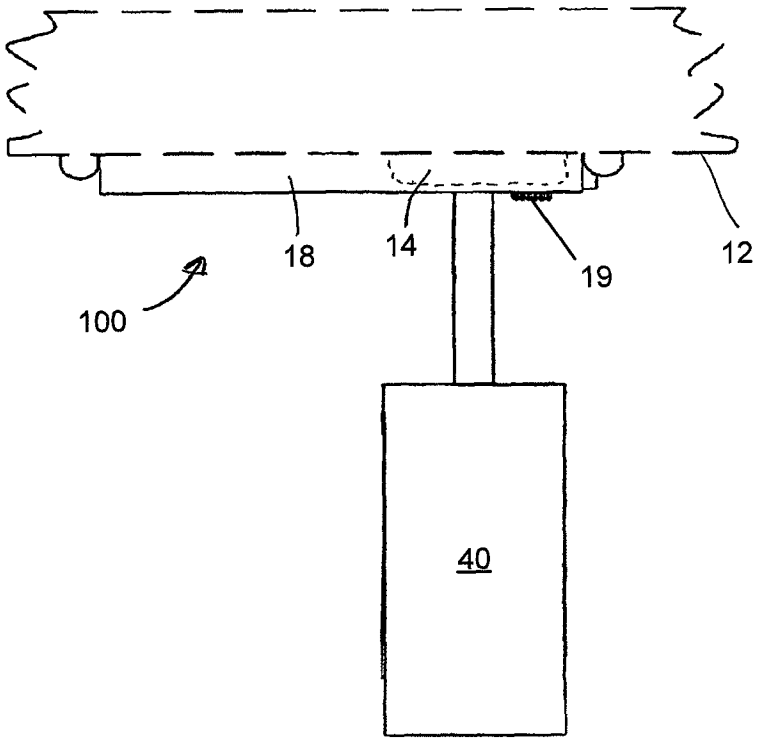
FIG. 14 is a side view of a device according to another embodiment of the invention.

The suspender may include a means for fixing the position of the luminaire 40 relative to the housing 18. For example, in the embodiment depicted in FIG. 10a, wherein the suspender is a yoke 42, a nut 45 may be used to fix the position of the luminaire 40 relative to the housing 18. FIG. 9b depicts an embodiment where the suspender may include a lock 91 for maintaining a predesigned focusing radius of the luminaire 40. FIGS. 2a, 2b, and 14 depict embodiments of the invention in which a lock 51 may be located on the housing (FIGS. 2a, 2b, and 14).

Figure 12A:
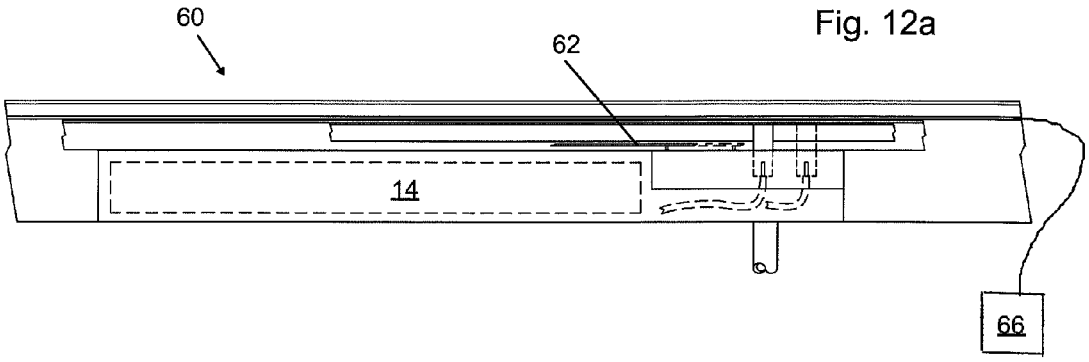
FIG. 12a is a side view of a system according to another embodiment of the invention showing a portion of the track and a communication circuit.
Figure 12B:
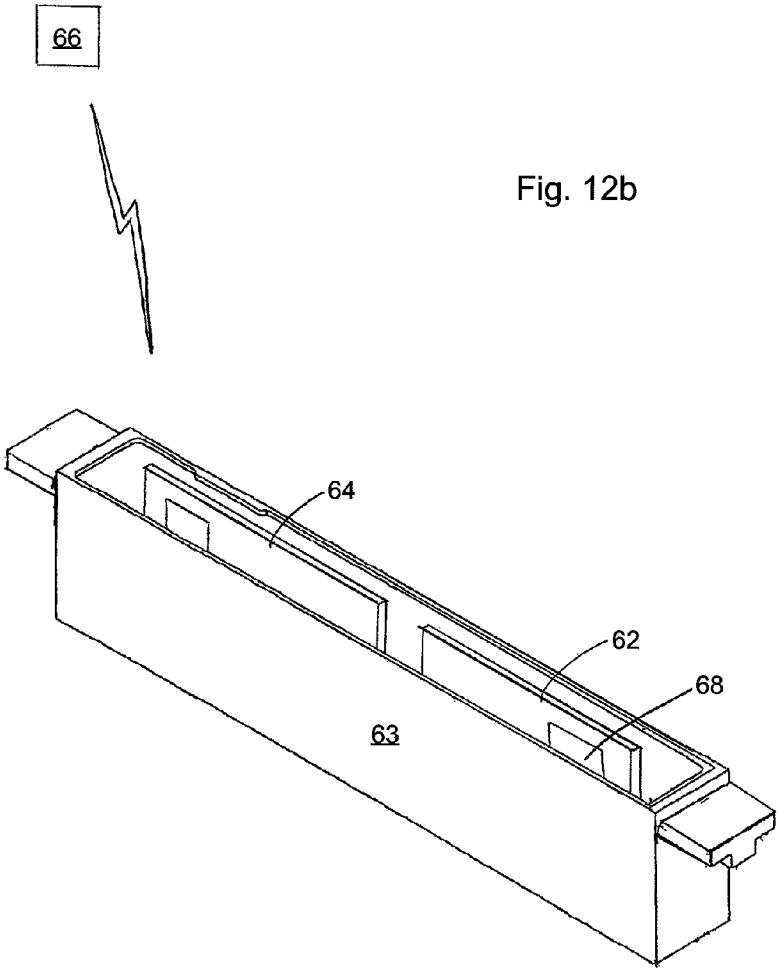
FIG. 12b is a perspective view of a system according to another embodiment of the invention showing a communication circuit capable of wireless communications—the track is not shown.

FIG. 12a depicts a system 60 according to another embodiment of the invention which includes a communication circuit 62 electrically connected to the power supply 14. The communication circuit 62 may be in communication with a control system 66 that may remotely control the power supply 14. In this manner, the lamp may be turned on, turned off, dimmed, or otherwise affected remotely. The housing 63 may surround communication circuit 62, which may also comprise a receiver 68 for wireless communication with the control system 66 (see, e.g., FIG. 12b).

FIG. 14 depicts a device 100 which is in keeping with the invention, which includes a power supply 14 and a housing 18 surrounding the power supply. The housing 18 may be configured to be inserted in and attached to a track 12. In this way, the power supply 14 may be capable of being substantially contained in a track 12. The device 100 may include a luminaire 40, which may comprise an HID, LED, or fluorescent lamp.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A power delivery system comprising:

a track having a base, a top track opening and a bottom track opening; wherein the track is generally rectangular and extends longitudinally;

the track having a first vertical track side and a second vertical track side that extend from a bottom of the track to a top of the track;

the top of the first vertical track side having a first flange and the top of the second vertical track side having a second flange; wherein the first flange and the second flange extend horizontally inward and the top track opening extends between the first flange and the second flange to form the base for interfacing with a support;

the bottom track opening extends between a lower terminus of the first vertical track side and a lower terminus of the second vertical track side;

a channel is formed by the bottom track opening, an inner surface of the first vertical track side, an inner surface of the second vertical track side and a top channel surface; wherein the top channel surface is part of a divider separating a support interface from the channel; the divider includes electrical connections for supplying power;

the inner surface of the first vertical track side has at least one groove or rail and the inner surface of the second vertical track at least one groove or rail for interfacing with a first light fixture and a power supply;

the power supply has a housing which includes a top outer housing surface, a first outer side housing surface, a second outer side housing surface, and a bottom outer housing surface;

the first outer side housing surface and the second outer side housing surface each have at least one groove or rail for removably attaching the housing to the channel;

the housing matches a shape of the channel to maximize contact with the [channel] *track* and promote heat exchange;

the bottom outer housing surface is substantially in a horizontal plane with the bottom track opening;

wherein the bottom outer housing surface is configured to match an appearance of surrounding surfaces;

wherein the housing does not vertically overlap the first light fixture along the track;

wherein the housing is configured to encompass a majority of a [space in] *total volume of* the track and substantially all [space in] *of the total volume of* the track not *otherwise* occupied [by other components of the power delivery system] in order to maintain a continuity of appearance between a plurality of light fixtures, walls of the track and surrounding surfaces;

wherein the first light fixture is compatible for attachment with the at least one groove or rails of the inner surface of the first vertical track side and the inner surface of the second vertical track side; and, wherein the housing and the first light fixture are configured to slidably and independently attach [at an identical location] on the track such that the housing and the first light fixture are adjacent one another on the track.

[2. The power delivery system of claim 1, wherein said housing encloses an input with EMI filtering, an AC-to-DC conversion, and a modified DC signal to maintain stability of an output.]

3. The power delivery system of claim 1, wherein the power supply conditions power.

4. The power delivery system of claim 1, wherein the power supply provides a higher voltage required to strike an electrical arc in an HID lamp.

5. The power delivery system of claim 1, wherein the power supply provides a regulated constant current for LED lamps.

6. The power delivery system of claim 1, wherein the first vertical track side and the second vertical track side are of approximately equal size.

7. A power delivery system comprising:

a track having a base for interfacing with a support and a bottom track opening; wherein the track is generally rectangular and extends longitudinally;

the track having a first vertical track side and a second vertical track side that extend from substantially a bottom of the track to substantially a top of the track;

the bottom track opening extends between a lower terminus of the first vertical track side and a lower terminus of the second vertical track side;

a channel is formed by the bottom track opening, an inner surface of the first vertical track side, an inner surface of the second vertical track side and a top channel surface; wherein the top channel surface is part of a divider separating a support interface from the channel; the divider includes electrical connections for transferring electricity to a power supply for conditioning [the] power;

the power supply has a housing which includes a top outer housing surface, a first outer side housing surface, a second outer side housing surface, and a bottom outer housing surface;

wherein the power supply is contained within the track;

the housing matches a shape of the channel to maximize contact with the [channel] *track* and promote heat exchange;

the bottom outer housing surface is substantially in a horizontal plane with the bottom track opening;

wherein the bottom outer housing surface is configured to match an appearance of the track and surrounding surfaces; and, wherein the housing is configured to encompass a majority of a [space in] *total volume of* the track and substantially all [space in] *of the total volume of* the track not *otherwise* occupied [by other components of the power delivery system] in order to maintain a continuity of appearance between light fixtures, walls of the track and the surrounding surfaces.

8. The power delivery system of claim 7, wherein the housing maintains a continuity of a ceiling line when the track is recessed in a ceiling.

9. The power delivery system of claim 7, wherein the bottom outer housing surface is configured to match an appearance of an outer surface of the first vertical track side and an vertical outer surface second side of track such that the bottom outer housing surface is substantially indistinguishable from the track.

10. The power delivery system of claim 7, wherein the housing and a first light fixture are configured to slidably and independently attach [at an identical location] on the track such that the housing and the first light fixture are adjacent one another on the track.

11. The power delivery system of claim 7, wherein a power source connects to the power supply in the channel with a neutral wire and a hot wire that are in separate insulated chambers, sharing a common central wall that extends below the neutral wire and the hot wire and prevents contact between the neutral wire and the hot wire.

*12. A power delivery system comprising:*

*a track having a base, a top track opening and a bottom track opening; wherein the track is generally rectangular and extends longitudinally;*

*the track having a first vertical track side and a second vertical track side that extend from a bottom of the track to a top of the track;*

*the top of the first vertical track side having a first flange and the top of the second vertical track side having a second flange; wherein the first flange and the second flange extend horizontally inward and the top track opening extends between the first flange and the second flange to form the base;*

*the bottom track opening extends between a lower terminus of the first vertical track side and a lower terminus of the second vertical track side;*

*a channel is formed by the bottom track opening, an inner surface of the first vertical track side, an inner surface of the second vertical track side and an inner surface of the top of the track;*

*wherein a set of electrical connections for supplying power are situated along at least one of the inner surfaces of the first vertical track side, the inner surface of the second vertical track side and the inner surface of the top of the track;*

*the inner surface of the first vertical track side has at least one groove or rail and the inner surface of the second vertical track has at least one groove or rail for interfacing with a power supply;*

*the power supply has a housing which includes a top outer housing surface, a first outer side housing surface, a second outer side housing surface, and a bottom outer housing surface;*

*the first outer side housing surface and the second outer side housing surface each have at least one groove or rail for removably attaching the housing to the channel;*

*the housing matches a shape of the channel to maximize contact with the track and promote heat exchange;*

*the bottom outer housing surface is substantially in a horizontal plane with the bottom track opening;*

*wherein the bottom outer housing surface is configured to match an appearance of surrounding surfaces;*

*wherein the housing does not vertically overlap an at least one light fixture along the track;*

*wherein the housing is configured to encompass a majority of a total volume of the track and substantially all of the total volume of the track not otherwise occupied in order to maintain a continuity of appearance between the at least one light fixture, walls of the track and surrounding surfaces;*

*wherein the at least one light fixture is compatible for attachment with the at least one groove or rail of the inner surface of the first vertical track side and the at least one groove or rail inner surface of the second vertical track side; and*

*wherein the housing and the at least one light fixture are configured to slidably and independently attach on the track such that the housing and the at least one light fixture are adjacent one another on the track.*

*13. A power delivery system comprising:*

*a track having a base for interfacing with a support and a bottom track opening;*

*wherein the track is generally rectangular and extends longitudinally;*

*the track having a first vertical track side and a second vertical track side that extend from substantially a bottom of the track to substantially a top of the track;*

*the bottom track opening extends between a lower terminus of the first vertical track side and a lower terminus of the second vertical track side;*

*a channel is formed by the bottom track opening, an inner surface of the first vertical track side, an inner surface of the second vertical track side and an inner surface of the top of the track;*

*wherein a set of electrical connections for supplying power are situated along at least one of the inner surfaces of the first vertical track side, the inner surface of the second vertical track side and the inner surface of the top of the track;*

*a power supply has a housing which includes a top outer housing surface, a first outer side housing surface, a second outer side housing surface, and a bottom outer housing surface;*

*wherein the power supply is contained within the track;*

*the housing matches a shape of the channel, thereby promoting heat exchange from the power supply to the track;*

*the bottom outer housing surface is substantially in a horizontal plane with the bottom track opening; and*

*wherein the housing is configured to encompass a majority of a total volume of the track and substantially all of the total volume of the track not otherwise occupied such that the housing maintains a visual continuity of surface between the housing, the track and surfaces surrounding the track when viewed from a position below the track.*

* * * * *